United States Patent
Appleqvist et al.

(10) Patent No.: US 6,703,062 B1
(45) Date of Patent: Mar. 9, 2004

(54) LOW-FAT FOOD EMULSIONS HAVING CONTROLLED FLAVOR RELEASE AND PROCESSES THEREFOR

(75) Inventors: Ingrid Anne Appleqvist, Shambrook (GB); Charles Rupert Brown, Shambrook (GB); Jennifer Elizabeth Homan, Shambrook (GB); Malcolm Glyn Jones, Shambrook (GB); Mark Emmett Malone, Shambrook (GB); Ian Timothy Norton, Shambrook (GB)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/762,201

(22) PCT Filed: Jul. 15, 1999

(86) PCT No.: PCT/EP99/05041
§ 371 (c)(1),
(2), (4) Date: May 4, 2001

(87) PCT Pub. No.: WO00/07462
PCT Pub. Date: Feb. 17, 2000

(30) Foreign Application Priority Data

Aug. 6, 1998 (GB) .............................................. 9817182

(51) Int. Cl.⁷ ............................. A23G 3/00; A23D 7/00; A23L 1/0524
(52) U.S. Cl. ...................... 426/565; 426/573; 426/576; 426/577; 426/578; 426/589; 426/602; 426/605; 426/650

(58) Field of Search .................................. 426/573, 576, 426/577, 578, 602, 650, 565, 605, 589

(56) References Cited

U.S. PATENT DOCUMENTS

| | | | |
|---|---|---|---|
| 5,508,055 A | * | 4/1996 | Rubow et al. ............... 426/573 |
| 5,508,056 A | * | 4/1996 | Norton et al. ............... 426/602 |
| 5,593,716 A | * | 1/1997 | Appelqvist et al. ......... 426/589 |
| 6,068,876 A | * | 5/2000 | Miller et al. ................. 426/604 |

FOREIGN PATENT DOCUMENTS

| | | | |
|---|---|---|---|
| EP | 0 558 113 A | | 9/1993 |
| WO | 90/00354 A | | 1/1990 |
| WO | WO 95/12323 | * | 5/1995 |
| WO | WO 97/13413 | * | 4/1997 |
| WO | WO 98/34501 | * | 8/1998 |
| WO | 00/07462 | | 2/2000 |

OTHER PUBLICATIONS

International Search Report claiming priority on PCT 99/05041 dated Nov. 11, 1999.

* cited by examiner

Primary Examiner—Nina Bhat

(57) ABSTRACT

Low-fat food emulsions comprise a continuous aqueous phase and a dispersed phase which comprises fat particles, gel particles and fat-soluble flavor molecules; substantially all of the fat particles are located within the gel particles, and at least 35 w. % of the flavor molecules are located in a plurality of the gel particles. The rate of release of the flavor molecules from the emulsion is delayed and controlled following the gradual break down of the particles, thereby imparting the taste and mouthfeel of a full-fat emulsion.

18 Claims, 8 Drawing Sheets

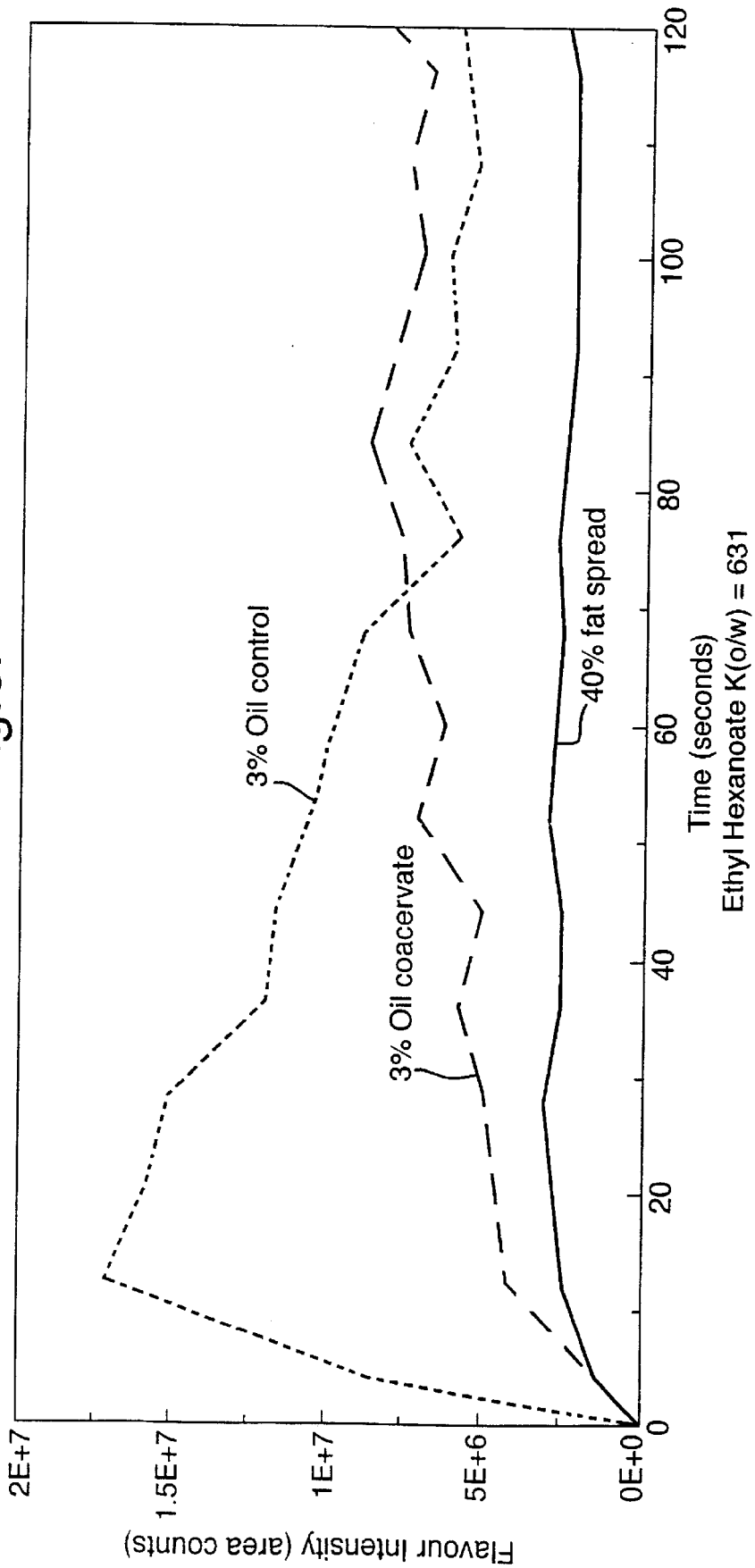

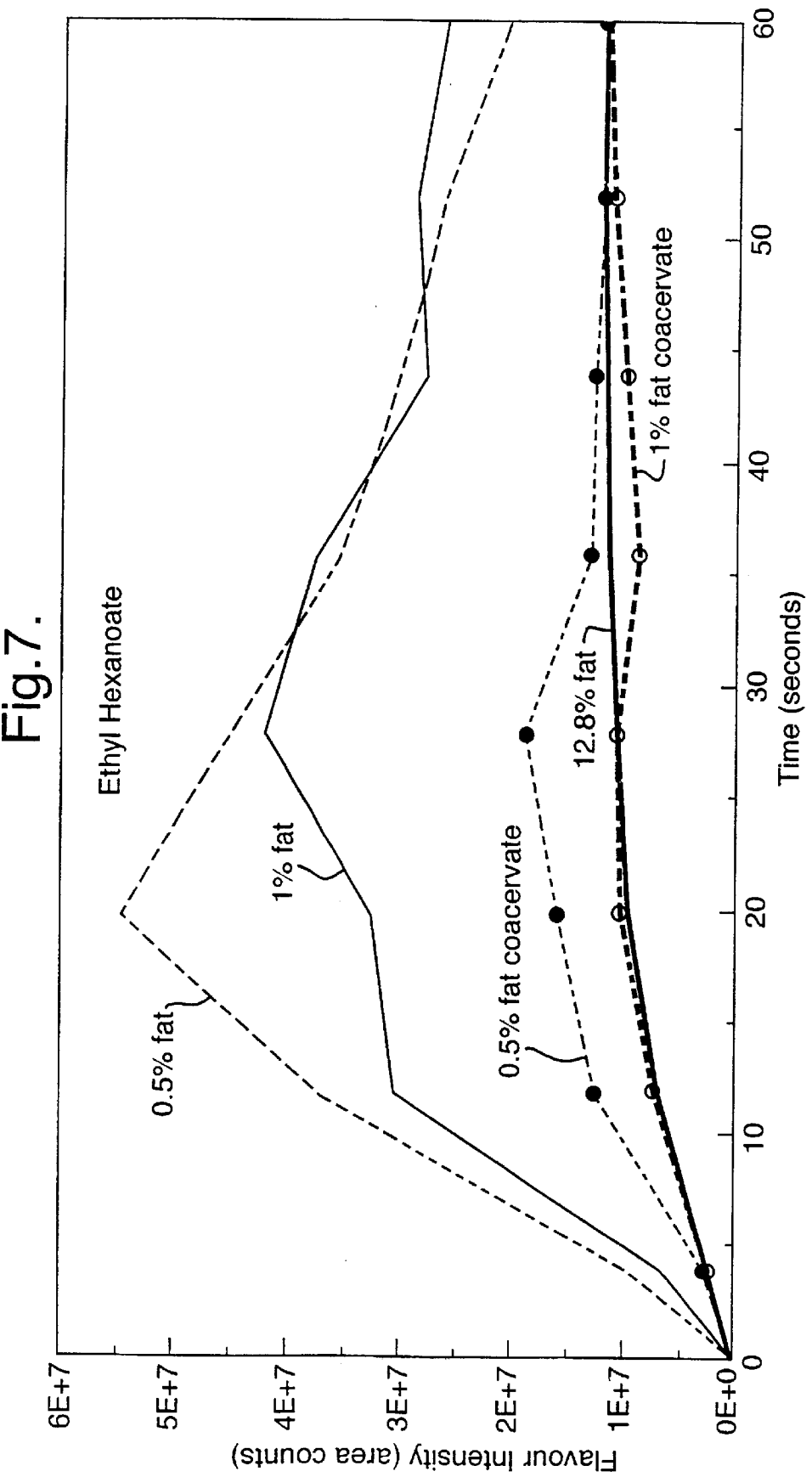

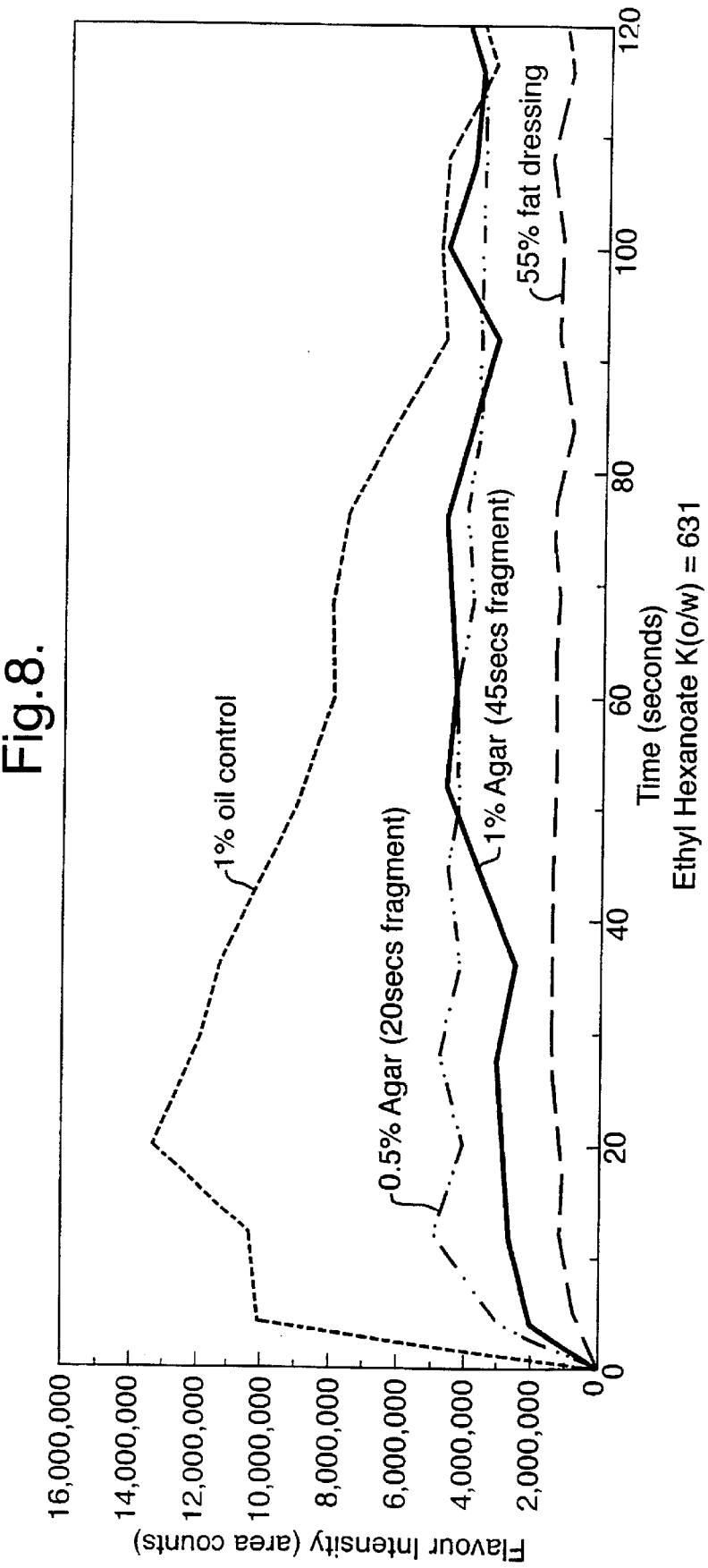

LOW-FAT FOOD EMULSIONS HAVING CONTROLLED FLAVOR RELEASE AND PROCESSES THEREFOR

FIELD OF THE INVENTION

The present invention relates to low-fat food emulsions, particularly to low-fat oil-in-water emulsions, and to processes for preparing these emulsions.

BACKGROUND ART

Although an increasing number of consumers prefer low-fat food products over full fat food products, it is difficult for manufacturers of low-fat products to replicate the desired flavor and fatty mouthfeel of full-fat products. This difficulty is particularly a problem in low-fat oil-in-water emulsions such as dressings.

It has been demonstrated that lowering the fat content of foods gives rise to flavor imbalance, as the rate of flavor release is greater in fat-reduced foods; in this respect, reference is made to an article by Shamil et al in Food Quality and Preference 1991/2, 3 (1) 51–60 entitled "Flavor release and perception in reduced-fat foods".

The greater rate of flavor release in reduced-fat oil-in-water food emulsions is demonstrated by the present inventors in FIG. 1, which is a graph of profiles of flavor intensity against time for dressings having different levels of fat (see line 1 (traditional zero fat dressing) and line 2 (traditional 55 wt % fat dressing)).

During oral processing, full-fat (eg 55 wt % fat) dressings exhibit a gradual build up of flavor to a low peak of maximum flavor impact, followed by a slow dissipation of flavor. In contrast, traditional very low-fat/zero-fat (0.85% fat) dressings exhibit a rapid dissipation of flavor creating a very high peak of maximum flavor impact at an early stage of oral processing.

The profile exhibited by full-fat dressings equates to a taste and mouthfeel that are preferred by consumers: the profile exhibited by low-fat dressings equates to a flavor which is initially too intense, with no pleasing aftertaste.

Many important flavor molecules are lipophilic and hydrophobic. As fat levels are reduced in oil-in-water emulsions, a greater proportion of these flavor molecules are found in the water phase. When the emulsion is broken down, eg in the mouth during eating, the hydrophobic nature of the flavor molecules results in their rapid release into nasal airspace.

Developments in flavor technology have resulted in flavor molecules being encapsulated to control flavor release and to stabilise and protect the molecules. Commonly-used encapsulation techniques include spray-drying, bed fluidisation and coacervation. (See the reference "Encapsulation and Controlled Release" by Karsa and Stephensen, Royal Soc Chem, ISBN 0.85/86-6/5-8.)

These techniques involve entrapping a flavor molecule within a covering or microcapsule. The resulting encapsulated product is often in the form of small dry particles, which are added to foodstuffs. Upon heating or eating the foodstuffs, the particles are thermally or physically broken down to release the flavor molecules. The release is normally rapid.

U.S. Pat. No. 5,498,439 discloses encapsulating flavor oils in a colloid gel, which is made from water and animal protein polymers or plant polysaccharides. The flavor oil is mixed with the gel components under high shear pressure to create a stable colloid gel matrix, in which the flavor oil is physically encapsulated and retained by the hydrophilic nature of the gel. A solution of the encapsulated flavor oil may be injected into meat to impart flavor thereto.

Co-pending application PCT/EP98/00645 (WO98/34501) describes non-frozen, low fat food emulsions having a delayed flavor release. In this reference, delayed flavor release is achieved by preparing biopolymer gel particles which contain small oil droplets containing flavor molecules. A delayed flavor release was obtained. The delayed flavor release was found to be due to (hindered) diffusion due to the presence of the gel biopolymer material surrounding the oil droplets containing a large proportion of the flavor molecules. The particles remained (to a large extent) intact for 60 to 90 seconds after consumption.

Although the solutions as proposed in PCT/EP98/00645 are for many purposes satisfactory in terms of delayed flavor release, it still leaves the desire for a solution for achieving more control on the flavor release pattern for some applications.

The present invention seeks to provide a low-fat food emulsion having a rate of flavor release which is more comparable to that of a full-fat food emulsion (than to the release rate found in traditional low/zero fat products) and which flavor release rate can be delayed and controlled, thereby creating a low-fat food emulsion having the texture and flavor of a full-fat food emulsion or novel flavor profiles different from those of zero or full fat products.

SUMMARY OF THE INVENTION

According to the present invention there is provided a low-fat food emulsion or dispersion comprising a continuous aqueous phase and a dispersed (or emulsified or suspended) phase which comprises fat particles, gel particles and fat-soluble flavor molecules, wherein at least 50% (but preferably substantially all) of the fat particles are located within the gel particles, and wherein at least 35% of the flavor molecules are located in a plurality of the gel particles to thereby delay the rate of release of the flavor molecules from the emulsion or suspension, and wherein at least part of the gel particles is gradually broken down in the mouth upon consumption, such that after 10 seconds after consumption the majority of the particles is still intact and 60 seconds after consumption at least the majority of the particles is no longer intact.

DETAILED DESCRIPTION OF THE INVENTION

In the present invention, words like suspension, emulsion, or dispersion are used mixed, to describe the whole of the composition with in it the gelled particles. Although strictly speaking, as they are particles, they are suspended in the rest of the composition, and one should speak of a suspension. However, as they predominantly are made up of a gelled water phase (with in them oil droplets), this could also be regarded as an emulsion, which is why these words are also used herein to describe the system.

The actual amount of flavor molecules which is located in the gel particles will depend on the oil/water partition coefficient of the flavor molecules concerned. In the above, it is preferred that a plurality (i.e. more than 50%) of the flavor molecules are located in a plurality of the gel particles (which may be the case when the flavor molecule has a better solubility in oil than in water). The higher the percentage of the flavor molecules that is located in the gel particles, the better the delayed release is obtained.

For the purpose of the present invention, fat-soluble flavor molecules include flavor molecules which are totally soluble in fat or oil and flavor molecules which are only partially soluble in fat.

The gel particles are prepared from material comprising at least one food grade gel-forming biopolymer. The gel particles should be made such that they break down in the mouth upon consumption. This can be achieved by e.g. ensuring the particles are physically weak, so that they break down following shear forces that are present in the mouth. Weak particles can be obtained e.g. by using low concentrations of biopolymers when preparing them. Alternatively, the gel particles can be made from a material that breaks down following a trigger present in the mouth, e.g. gel particles from starch and/or derivatives thereof may be broken down by amylase present in the saliva, or particles made of gelatin may melt as a result of the temperature in the mouth. The biopolymer chosen for the gel particles may consist of a mixture and may also break down following a combination of break down triggers. An example of the latter are large, weak gelatin particles which break down following melting and as a result of shear forces. Starch, gelatin, agar (when used in low concentrations) and mixtures thereof are preferred biopolymers in this invention. Other biopolymers that could be used include carrageenan which can be made to melt close to mouth temperatures (via ion concentration and type), gellan, and pectin which could be made physically weak so that it breaks down under mouth shear, and CMC and Gum arabic which are used with gelatin to make coacervates which melt in the mouth. Casein gels can also be made to breakdown in the mouth via shear. Most preferred are starch and/or starch derivatives, gelatin and agar.

Mixtures of proteins and polysaccharides are preferred as they may interact associatively, dissociatively, or synergistically.

The low-fat-emulsion of the present invention may comprise between 0 and 30 wt % fat. Preferably the amount of fat is less than 10 wt % fat, more preferably less than 5 wt % fat. In a preferred embodiment, the emulsion comprises at least 0.01 wt % fat, more preferably at least 0.5 wt %. Emulsions having less than 3 wt % fat are also preferred: this very low level of fat are legitimately described as fat-free or zero-fat in many countries.

For the purpose of the present invention, the definition of fat includes liquid oil, crystallising fat blends and fat mimics such as sucrose polyesters.

When crystallising fat blends are used, enhanced control of flavor molecule transfer rates and additional textural benefits may be obtained.

The low-fat emulsion of the present invention may comprise from 0.1 to 99% by volume of gel particles, preferably from 5 to 50% by volume of gel particles. The gel particles may confer fat-like textural properties to the low-fat emulsion; in this respect, the emulsion preferably comprises from 20 to 99% by volume of gel particles.

The majority of the particles range in size from about 500 microns to about 8000 microns.

In the present invention it is believed that the profile of the flavor release is for the first few seconds (e.g. 10) is mainly diffusion controlled. If the material of the gel particles is well chosen, the rate of the flavor release is thereafter controlled by the speed of breakdown of the particles, in which their break down is described above. Usually, at 10 seconds after the microstructured emulsion (foodstuff) containing the emulsion is put in the mouth a minority is broken down. Over time, more and more particles break down causing a steady release of flavor molecules. After about 60 seconds, the majority of the particles is usually fully broken down. By chosing the material and size of the particles, the person skilled in the art can design the desired release profile, depending on the intended use.

The inventors of the claimed emulsion were surprised to find that the presence of gel particles delays the release of flavor molecules; this is surprising because the flavor molecules are of a size suitable for diffusing through the gel matrix of the particles. It is therefore understood that, in the present invention, the gel particles do not encapsulate the flavor molecules in the traditional sense, since the flavor molecules are not trapped within the gel particles.

Without wishing to be bound by theory, the inventors believe that the gel particles act as a static region within the mobile aqueous phase of the emulsion. When the emulsion is eaten, the aqueous phase is rapidly swept by oral fluids such as saliva, so that the flavor molecules are released very rapidly providing a very high initial flavor intensity which rapidly becomes depleted. A flavor molecule located in a gel particle diffuses therethrough as normal. By the time it has reached the surface of the gel particle to be swept by the oral fluids, a delay has occurred. Hence, flavor molecules located in gel particles experience delayed release relative to flavor molecules in the aqueous phase. In the emulsion, the dispersed fat phase is normally in the form of liquid oil droplets located in the gel particles. As many important flavor molecules are lipophilic (fat-soluble) they have a preference for solubilising in the oil droplets. The rationale behind this approach is that in o/w emulsions the release of lipophillic flavors occurs in the sequence oil→water→air. It is therefore possible to control the release of lipophillic flavors by creating barriers around the oil droplets which hinder their release into the aqueous phase. Microstructured emulsions do this by increasing the diffusional pathway and reducing the rate at which lipophillic flavors are released into the aqueous phase.

However, it has become apparent that particles that break down slowly during mastication ('mouth degradable particles') enable flavor release profiles to be obtained which exhibit very different flavor release profiles from that of both traditional low- and high-fat products. By controlling the properties of the gel particles, the oral breakdown of the el particles can be controlled, and following this, the flavor release can be controlled.

In accordance with the present invention there is also provided a process for the preparation of a low-fat food emulsion comprising the steps of
  a) admixing fat and a gel-forming biopolymer to form a first liquid phase
  b) adding the first liquid phase to a second liquid phase which promotes gel formation of the biopolymer to form gel particles having particles of fat located therein
  c) mixing the gel particles with an aqueous phase and fat-soluble flavor molecules to form an aqueous-continuous emulsion, wherein at least part of the gel particles is gradually broken down in the mouth upon consumption, such that 10 seconds after consumption the majority of the particles is still intact and 60 seconds after consumption at least the majority of the particles is no longer intact.

Optionally, the first liquid phase is emulsified prior to step b. In step b, the first liquid phase may be injected into the second liquid phase. Alternatively, in step b, the first liquid phase may be sprayed on to the second liquid phase.

The second liquid phase may have a lower temperature than the first liquid phase in order to effect gel formation. Alternatively, the second liquid phase may react with the biopolymer in the first liquid phase in order to effect gel formation.

An emulsion according to the present invention may also be prepared using one of the following processes.

1) Shear Gel Method

Heat and homogenise the emulsion ingredients to form an oil in water emulsion. Cool the emulsion under shear.

2) Multiple Emulsion Method

Heat and homogenise the emulsion ingredients to form an oil in water in oil (duplex) emulsion. Cool the emulsion under shear and remove the outer oil phase.

When preparing a low-fat emulsion in accordance with the present invention, flavor components need minimal rebalancing to account for the low phase volume of fat.

Also, critical flavors, which are normally fat-soluble and therefore particularly prone to uncontrolled release in low fat emulsions, are released according to their "full-fat" timescale, thereby improving the perception of their flavor.

The present invention provides means for controlling the transfer rates, including the rate of release, of flavor molecules in an emulsion, thereby allowing manipulation of the flavor release profile of low-fat emulsions. It also provides means for manipulating the texture of low-fat emulsions. Hence, low-fat emulsions can be prepared which have the taste and mouthfeel of full-fat emulsions. The present invention achieves this without recourse to an encapsulating coating which must be heated or solubilised in order to release encapsulated flavors.

The present invention can be applied in the manufacture of products like spreads, dressings, mayonnaise, sauces, ice-cream (including water-ice) etcetera, and related products that are regarded as the products mentioned above; being low in fat (including those products that are regarded as zero fat, but still contain few percentages of fat).

BRIEF DESCRIPTION OF DRAWINGS

FIG. 6: Flavor intensity over time for various spreads.

FIG. 7: Flavor intensity over time for various ice-creams.

FIG. 8: Flavor intensity over time for various dressings.

The invention is further exemplified by the following examples, which are to be understood as to be non-limiting.

EXAMPLE 1

Starch Gel Particles (Amylase Trigger)

A native starch (comprising 80% amylopectin and 20% amylose) emulsion containing 10 wt % sunflower oil emulsified with 0.5% whey protein concentrate was poured into small eliptical moulds and placed into a refrigerator at 5° C. overnight until the starch gelled. These beadlets were added to a model dressing to give an oil level of 1 wt %. The flavor molecules ethyl hexanoate was added to the dressing and left for 48 hours to equilibrate in a sealed bottle.

Figure 1:
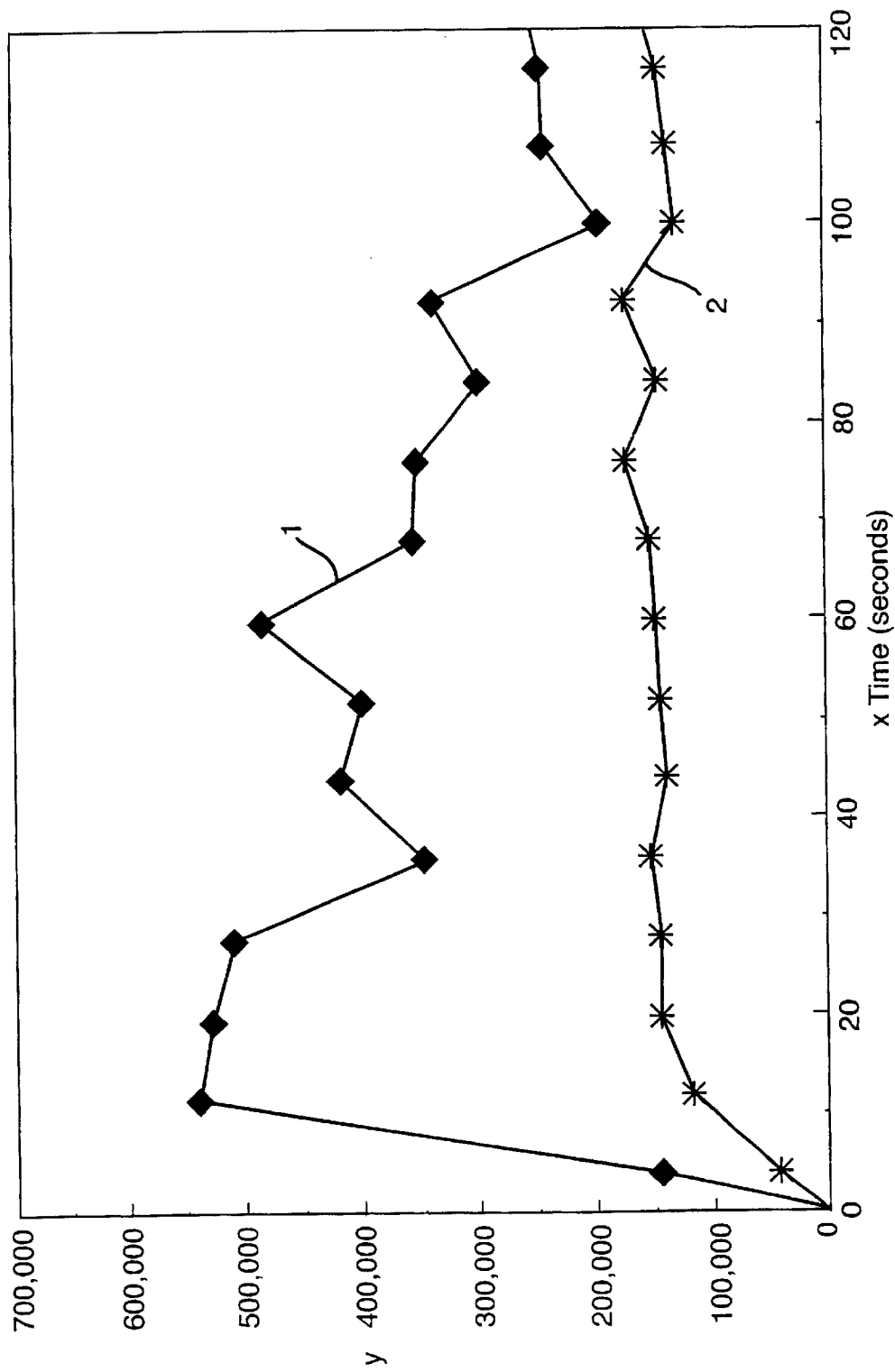
FIG. 1: Flavor intensity over time for zero fat and 55% fat dressings.
Figure 2:
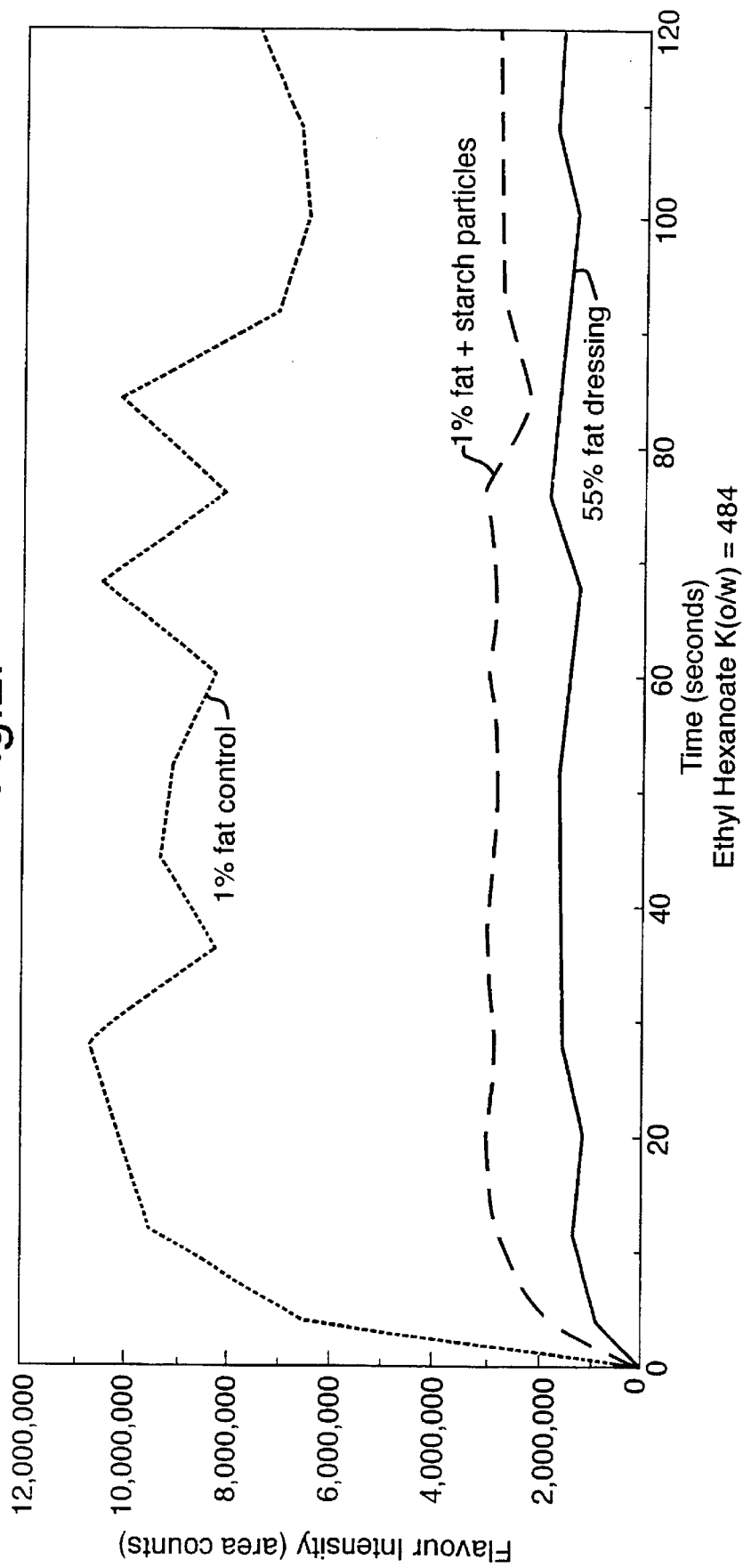
FIG. 2: Flavor intensity over time for zero fat (both control and according to invention) and 55% fat dressings.

A traditional full-fat dressing was prepared using xanthan gum and sunflower oil, to give an oil level of 55 wt %. The flavor molecule ethyl hexanoate was added to the dressing and left for 48 hours to equilibrate in a sealed bottle. A flavor intensity over time profile was plotted and compared to a control 1 wt % emulsion in which the oil was dispersed in the continuous phase. The resulting profiles are shown in FIG. 2.

Results

It can be seen that the from the low-fat dressing in which the oil is located outside the gel particles, the flavor molecules of ethyl hexanoate are rapidly released, resulting in a very high peak of flavor intensity, followed by a rapid dissipation of the flavor intensity.

However, it can be seen that the low-fat dressing containing the present invention with the starch particles containing the oil, the flavor release profile for ethyl hexanoate exhibits a very gradual build up of flavor to a low intensity which is maintained throughout the eating time. The starch particles are very soft and highly deformable which probably begin to fragment and break down during the eating process. It is very clear that the temporal flavor release profile is identical to the flavor release profile from the traditional full-fat dressing which exhibits a very gradual build up of flavor to a low intensity which is maintained as a plateau throughout the eating process.

EXAMPLE 2

The methods of example 1 were repeated but using heptan-2-one rather than ethyl hexanoate as the flavor molecule marker.

A traditional full-fat dressing was prepared using xanthan gum and sunflower oil, to give an oil level of 55 wt %. The flavor molecule ethyl hexanoate was added to the dressing and left for 48 hours to equilibrate in a sealed bottle.

Figure 3:
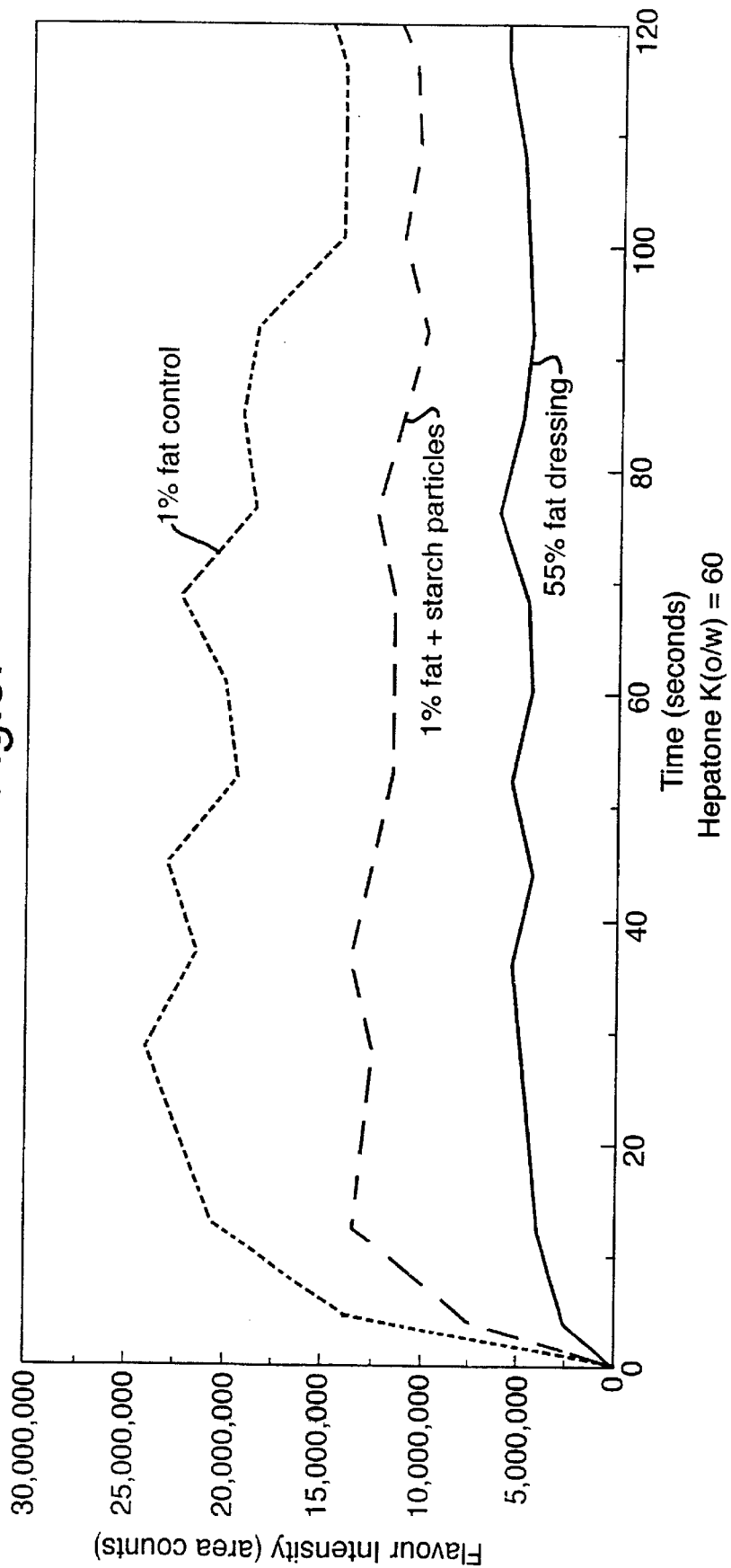
FIG. 3: Flavor intensity over time for zero fat (both control and according to invention) and 55% fat dressings.

A flavor intensity over time profile was plotted and compared to a control 1 wt % emulsion in which the oil was dispersed in the continuous phase. The resulting profiles are shown in FIG. 3.

Results

It can be seen that the from the low-fat dressing in which the oil is located outside the gel particles, the flavor molecules of heptan-2-one are rapidly released, resulting in a very high peak of flavor intensity, followed by a rapid dissipation of the flavor molecules.

However, it can be seen that the low-fat dressing with the starch particles containing the oil, the flavor release profile for heptan-2-one exhibits a more gradual build up of flavor to a lower intensity in the early stages of oral processing which is maintained throughout the eating time. Although at a higher intensity it is clear that the temporal flavor release profile containing the current invention is very similar to the traditional full fat dressing which exhibits a very gradual build up of flavor to a low intensity which is maintained as a plateau throughout the eating process.

EXAMPLE 3

Gelatin Gel Particles (Temperature Trigger)

Gelatin emulsions containing 10 wt % sunflower oil were made with different hardness and melting times by altering the gelatin concentration between 2.0% and 5.0%. The emulsions were poured into small eliptical moulds and placed in the refrigerator at 5° C. overnight or until the gelatin gelled. These particles were added to a model dressing to give an oil level of 1 wt %. The flavor molecules ethyl hexanoate was added to the dressing and left for 48 hours to equilibrate in a sealed bottle.

A traditional full-fat dressing was prepared using xanthan gum and sunflower oil, to give an oil level of 55 wt %. The flavor molecule ethyl hexanoate was added to the dressing and left for 48 hours to equilibrate in a sealed bottle.

Figure 4:
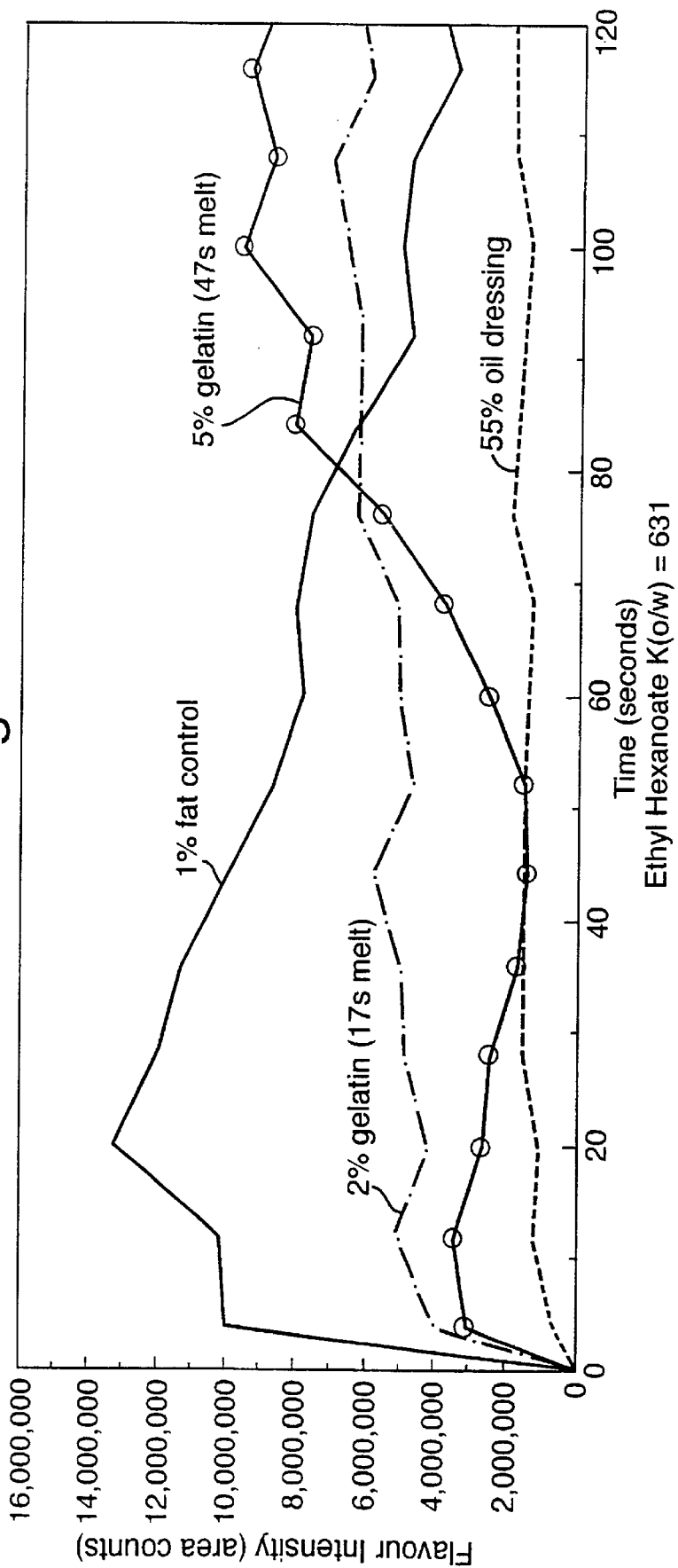
FIG. 4: Flavor intensity over time for various dressings.

A flavor intensity over time profile was plotted and compared to a control 1 wt % emulsion in which the oil was dispersed in the continuous phase. The resulting profiles are shown in FIG. 4.

Results

It can be seen that the from the low-fat dressing in which the oil is located outside the gel particles, the flavor molecules of ethyl hexanoate are rapidly released, resulting in a very high peak of flavor intensity, followed by a rapid dissipation of the flavor intensity.

It can be seen that the flavor profile for the low-fat dressing containing the present invention with the gelatin particles containing the oil, demonstrates that not only the flavor intensity has been adjusted but the shape of the release profile has also been modified which is dependent on the time taken to melt the gelatin. In the case of the 5% gelatin particles the initial flavor intensity is reduced providing a gradual build up of flavor to a low intensity which is sustained for about 50 seconds. At this point the flavor intensity begins to rise rapidly which is due to the gelatin particles melting. In the case of the dressing containing the 2% gelatin particles, the flavor release profile shows a gradual increase in flavor intensity throughout the eating process and is clearly different to the flavor profile from the dressing containing 5% gelatin particles. Both the temporal flavor release profiles from the two dressings containing the present invention are different fron the flavor release profile from the traditional full-fat dressing which exhibits a very gradual build-up of flavor to a low intensity which is maintained as a plateau throughout the eating process.

EXAMPLE 4

Coacervate gel particles (temperature trigger) in dressings Powdered gelatin (3%w/w) was dispersed into cold distilled water and heated to 70° C. until all the gelatin was dissolved. This solution was cooled to 40° C. Gum arabic (3%w/w) was also dispersed in cold distilled water and heated to 80° C. until all the gum arabic was dissolved. Sunflower oil (3% w/w) was added and sheared (Silverson lab mixer) until a stable emulsion was produced. The emulsion was cooled to 40° C. The gelatin solution was added very slowly to the gum arabic emulsion with continued gentle stirring at 40° C. Finally, GDL (0.5%) dissolved in a small volume of water was added to the gelatin-gum arabic solution which was kept for two hours under gentle stirring above 35° C. The pH was monitored so that it reached a value ranging between 3.6–3.3. This final solution was immediately cooled in an ice bath while still under gentle stirring to produce the coacervates which had a particle size of approximately 100–500 microns. The coacervate particles were allowed to settle and the supernatant was decantered off.

The coacervates were added to a model dressing to give an oil level of 3 wt %. The flavor ethyl hexanoate was added to the dressing and left for 48 hours to equilibrate in a sealed bottle.

A traditional full-fat dressing was prepared using xanthan and sunflower oil, to give an oil level of 55 wt %. The flavor molecule ethyl hexanoate was added to the dressing and left for 48 hours to equilibrate in a sealed bottle.

Figure 5:
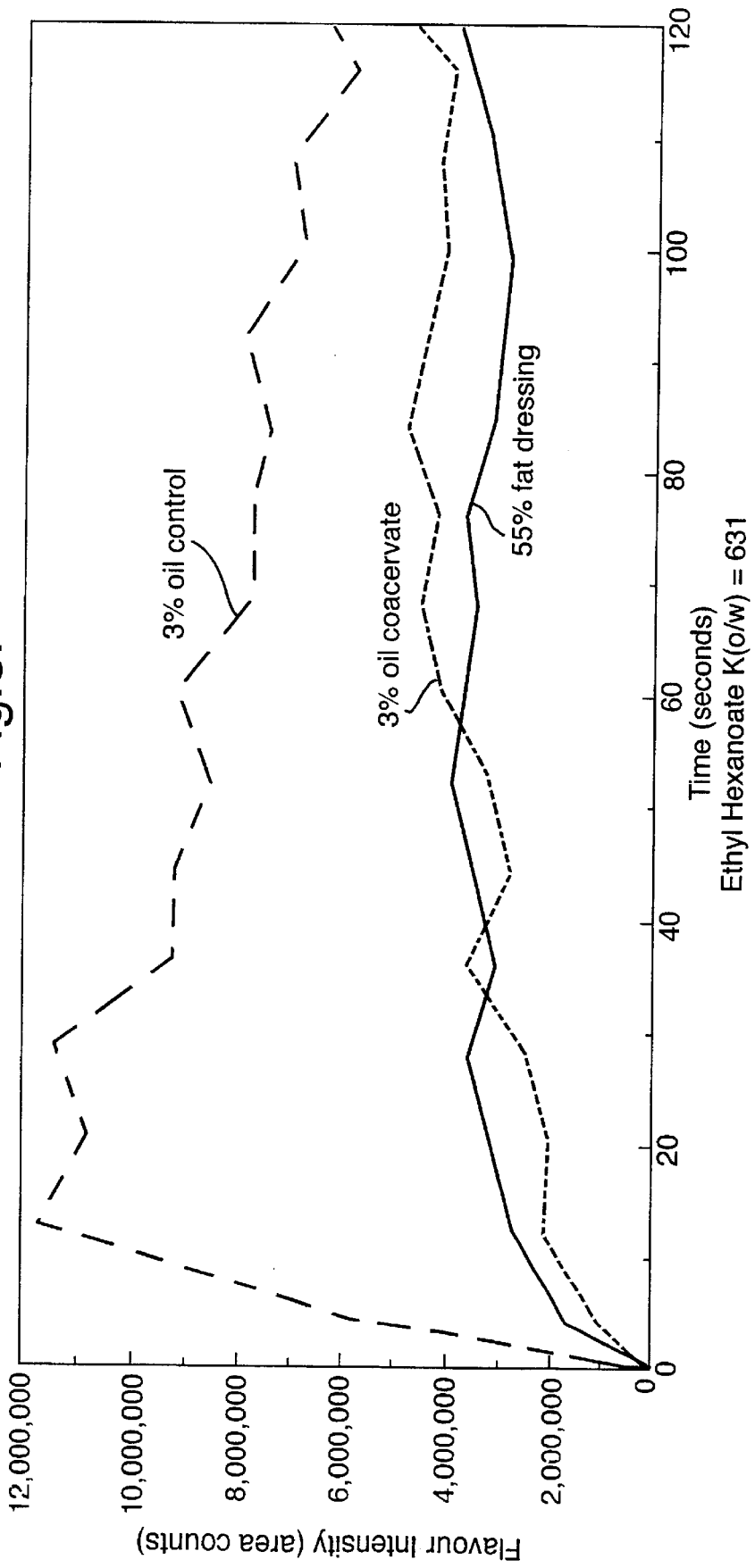
FIG. 5: Flavor intensity over time for various dressings.

A flavor intensity over time profile was plotted and compared to a control 3 wt % emulsion in which the oil was dispersed in the continuous phase. The resulting profiles are shown in FIG. 5.

Results

It can be seen that the from the low-fat dressing in which the oil is located outside the gel particles, the flavor molecules of ethyl hexanoate are rapidly released, resulting in a very high peak of flavor intensity, followed by a rapid dissipation of the flavor intensity.

However, it can be seen that the low-fat dressing containing the present invention (with the coacervate particles containing the oil), which melt down very slowly provide a flavor release profile for ethyl hexanoate which exhibits a very gradual build up of flavor to a low intensity which is maintained throughout the eating time.

It is very clear that the temporal flavor release profile is identical to the flavor release profile from the traditional full-fat dressing which exhibits a very gradual build up of flavor to a low intensity which is maintained as a plateau throughout the eating process.

EXAMPLE 5

Coacervate Gel Particles in Spreads

The method of example 4 for the preparation of the coacervates was repeated but the coascervates were added to a model spread to give an oil level of 3 wt %. The flavor ethyl hexanoate was added to the spread and left for 48 hours to equilibrate in a sealed bottle.

A traditional full-fat spread was prepared using maltodextrin (SA2) and sunflower oil, to give an oil level of 40 wt %. The flavor molecule ethyl hexanoate was added to the spread and left for 48 hours to equilibrate in a sealed bottle.

A flavor intensity over time profile was plotted and compared to a control 3 wt % emulsion in which the oil was dispersed in the continuous phase. The resulting-profiles are shown in FIG. 6.

Results

It can be seen that the from the low-fat spread in which the oil is located outside the gel particles, the flavor molecules of ethyl hexanoate are rapidly released, resulting in a very high peak of flavor intensity, followed by a rapid dissipation of the flavor intensity.

However, it can be seen that the low-fat spread containing the present invention (with the coacervate particles containing the oil), which melt down very slowly provide a flavor release profile for ethyl hexanoate which exhibits a very gradual build up of flavor to a low intensity which increases in intensity very slowly due to the melting of the particle during the eating process.

It is very clear that the temporal flavor release profile is closer to the flavor release profile from the traditional full-fat dressing which exhibits a very gradual build up of flavor to a low intensity which is maintained as a plateau throughout the eating process.

EXAMPLE 6

Coacervate Gel Particles in Ice-cream

The method of example 4 for the preparation of the coacervates was repeated but the coacervates were added to a model ice-cream to give an oil level of 3 wt %. The flavor ethyl hexanoate was added to the ice-cream and left for 48 hours to equilibrate in a sealed bottle.

A traditional full-fat ice-cream was prepared using skim milk powder, sucrose, xanthan and sunflower oil, to give an oil level of 12.8 wt %. The flavor molecule ethyl hexanoate was added to the ice-cream and left for 48 hours to equilibrate in a sealed bottle.

A flavor intensity over time profile was plotted and compared to a control 3 wt % emulsion in which the oil was dispersed in the continuous phase. The resulting profiles are shown in FIG. 7.

Results

It can be seen that the from the low-fat ice-cream in which the oil is located outside the gel particles, the flavor molecules of ethyl hexanoate are rapidly released, resulting in a very high peak of flavor intensity, followed by a rapid dissipation of the flavor intensity. However, it can be seen that the low-fat ice-cream containing the present invention (with the coacervate particles containing the oil), which melt down very slowly provide a flavor release profile for ethyl hexanoate which exhibits a very gradual build up of flavor to a low intensity which increases in intensity very slowly due to the melting of the particle during the eating process.

It is very clear that the temporal flavor release profile is closer to the flavor release profile from the traditional full-fat ice-cream which exhibits a very gradual build up of flavor to a low intensity which is maintained as a plateau throughout the eating process.

EXAMPLE 7

Dressing Containing Agar Particles

Agar emulsions containing 10 wt % sunflower oil emulsified with 0.5% whey protein concentrate were prepared of different hardness by altering the agar concentration between 0.5% and 1.0%. The emulsions were poured into small elliptical moulds and placed in a refridgerator at 5° C. overnight until the agar gelled. These beadlets were added to a model dressing to give an oil level of 1 wt %. The flavor molecule ethyl hexanoate was added to the dressing and left for 48 hours to equilibrate in a sealed bottle.

A traditional full-fat dressing was prepared using xanthan gum and sunflower oil, to give an oil level of 55 wt %. Ehtyl hexanoate was added to the dressing and left for 48 hours to equilibrate in a sealed bottle.

Flavor intensity over time profiles were plotted and compared to a control 1 wt % emulsion in which the oil was dispersed in the continuous phase. The resulting profiles are shown in FIG. 8.

Results

The profiles show that the initial flavor intensity is suppressed and is not dependant on the hardness of the particles. However, att longer intervals the flavor release curve appears to be dependent upon both the hardness of the particle (increasing intensity with decreasing hardness) and on the fragmentation of the particle during the oral process. The low fat dressing which contains the present invention with 1% agar has different flavor release profile which exhibits a very gradula build up of flavor to a low intensity which is maintained until the agar particle starts to fragment which the causes more ethyl hexanoate to be released. The low fat dressing which contains the present invention with 0.5% agar has a flavor release profile which is very similar in shape to that of a full fat dressing. There is a gradual build up of flavor intensity (which is lightly higher than that for the 1% agar product in the initial stages) and which is maintained throughout, the eating process. These emulsion particles are the most soft and start to fragment much earlier in the mouth than the 1% agar particle.

What is claimed is:

1. A low-fat food emulsion comprising a continuous aqueous phase and a dispersed phase which comprises fat particles, gel particles and fat-soluble flavor molecules, wherein at least 50% of the fat particles are located within the gel particles, and wherein at least 35% of the flavor molecules are located in a plurality of the gel particles to thereby delay the rate of release of the flavor molecules from the emulsion, and wherein at least part of the gel particles is gradually broken down by amylase, shear force, temperature or a combination thereof in the mouth upon consumption, such that after 10 seconds after consumption the majority of the particles is still intact and 60 seconds after consumption at least the majority of the particles is no longer intact.

2. An emulsion according to claim 1, wherein substantially all of the fat particles are located within the gel particles, and wherein at least 35% of the flavor molecules are located in a plurality of the gel particles to thereby delay the rate of release of the flavor molecules from the emulsion, and wherein at least part of the gel particles is gradually broken down in the mouth upon consumption, such that after 10 seconds after consumption the majority of the particles is still intact and 60 seconds after consumption at least the majority of the particles is no longer intact.

3. An emulsion according to claim 1, wherein the dispersed phase which comprises fat particles, gel particles and fat-soluble flavor molecules, wherein substantially all of the fat particles are located within the gel particles, and wherein a plurality of the flavor molecules are located in a plurality of the gel particles to thereby delay the rate of release of the flavor molecules from the emulsion.

4. An emulsion as claimed in claim 1 wherein the gel particles are prepared from the biopolymers starch, derivatives of starch, gelatin, agar, locust bean gum, konjac mannan, carrageenan, gellan, pectin, CMC, gum arabic, casein, or mixtures thereof.

5. An emulsion as claimed in claim 1, wherein the gel particles are prepared of biopolymers of which at least 50% by weight is selected from the group consisting of starch, derivatives of starch, gelatin, agar and mixtures thereof.

6. An emulsion as claimed in claim 1 comprising from 0 to 30 wt % fat.

7. An emulsion as claimed in claim 6 comprising less than 10 wt % fat.

8. An emulsion as claimed in claim 7 comprising less than 5 wt % fat.

9. An emulsion as claimed in claim 1 comprising from 0.1 to 99.0% by volume of gel particles.

10. An emulsion as claimed in claim 9 comprising from 5.0 to 50.0% by volume of gel particles.

11. An emulsion as claimed in claim 10 comprising from 20.0 to 99.0% by volume of gel particles.

12. A emulsion as claimed in claim 1 wherein at least 90% of the gel particles have a size of at least 30 microns arid less than 5000 microns.

13. An emulsion as claimed in claim 12 wherein at least 90% of the gel particles have a size of at least 50 and less than 1000 microns.

14. An emulsion as claimed in claim 13 wherein at least 90% of the gel particles have a size of at least 100 to less than 500 microns.

15. A process for the preparation of a low-fat food emulsion comprising the steps of
   a) admixing fat and a gel-forming biopolymer to form a first liquid phase
   b) adding the first liquid phase to a second liquid phase which promotes gel formation of the biopolymer to form gel particles having particles of fat located therein
   c) mixing the gel particles with an aqueous phase and fat-soluble flavor molecules to form an aqueous-continuous emulsion, wherein at least part of the gel particles is broken down by amylase, shear force, temperature or a combination thereof in the mouth upon consumption, such that after 10 seconds after consumption the majority of the particles is still intact and 60 seconds after consumption at least the majority of the particles is no longer intact.

16. A process as claimed in claim 15, wherein, in step b, the second liquid phase has a lower temperature than the first liquid phase in order to promote gel formation.

17. A process as claimed in claim 15, wherein, in step b, the second liquid phase reacts with the biopolymer of the first liquid phase in order to promote gel formation.

18. Food product containing an emulsion according to claim 1, wherein the food product is a dressing, mayonnaise, spread or ice-cream.

* * * * *